United States Patent [19]
Stiles et al.

[11] Patent Number: 6,128,135
[45] Date of Patent: *Oct. 3, 2000

[54] THREE-REFLECTION COLLECTION SYSTEM FOR SOLAR AND LUNAR RADIANT ENERGY

[75] Inventors: Michael R. Stiles; Laurence F. Kinney, both of Syracuse, N.Y.

[73] Assignee: Synertech Systems Corporation, Syracuse, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/071,703

[22] Filed: May 1, 1998

[51] Int. Cl.$^7$ .................................................. G02B 17/00
[52] U.S. Cl. .............................................................. 359/597
[58] Field of Search .................................... 359/591, 593, 359/597

[56] References Cited

U.S. PATENT DOCUMENTS

| | | | |
|---|---|---|---|
| 2,646,720 | 7/1953 | Poliansky | 88/25 |
| 4,139,286 | 2/1979 | Hein et al. | 353/3 |
| 4,198,953 | 4/1980 | Power | 126/428 |
| 4,246,477 | 1/1981 | Latter | 250/214 |
| 4,349,245 | 9/1982 | Kliman | 350/264 |
| 4,373,514 | 2/1983 | Lambros | 126/438 |
| 4,429,952 | 2/1984 | Dominquez | 350/258 |
| 4,557,565 | 12/1985 | Ruck et al. | 350/262 |
| 4,630,892 | 12/1986 | Howard | 350/264 |
| 4,720,170 | 1/1988 | Learn, Jr. | 350/264 |
| 4,984,880 | 1/1991 | Mori | 350/616 |
| 5,285,315 | 2/1994 | Stiles | 359/592 |
| 5,493,824 | 2/1996 | Webster et al. | 52/200 |

Primary Examiner—Safet Metjahic
Assistant Examiner—Christopher Mahoney
Attorney, Agent, or Firm—George R. McGuire; Hancock & Estabrook, LLP

[57] ABSTRACT

A system utilizing a series of three mirrors for purposes of collecting, concentrating, collimating and distributing radiant flux, such as sunlight or moonlight. The system generally includes a first parabolic reflector having a hole formed centrally therethrough, a second parabolic reflector slightly smaller in diameter than the hole formed through the first reflector and attached in spaced relation thereto, such that the two reflectors share a common optical axis, and a third, planar reflector. A structural framework supports the three reflectors and includes a light pipe, or other light distributing channel, through which the collected light is sent. First and second motors actuate gear assemblies attached to the framework to cause the reflectors to track both the elevation and azimuth angles, respectively, of the sun and/or moon. One microprocessor operatively attached to position sensor assemblies incorporated into each of the motors, sends elevation and azimuth angle data to the sensors at predetermined intervals throughout each day, ultimately causing the motors to continuously adjust the position of the reflectors such that the first and second reflectors' optical axis is perfectly aligned with the elevation and azimuth angle of the sun, or moon, thereby maximizing the system's potential collection of radiant flux.

20 Claims, 7 Drawing Sheets

THREE-REFLECTION COLLECTION SYSTEM FOR SOLAR AND LUNAR RADIANT ENERGY

BACKGROUND OF THE INVENTION

The present invention generally relates to systems that collect, concentrate, collimate, and distribute sunlight, and more particularly to such systems which utilize a series of reflectors that track the sun to optimize its effects.

The prior art contains numerous inventions for collecting beam sunlight and transporting it to the interior of a building. These inventions have a number of system components, or stages, in common. To facilitate a comparison of the present invention with the prior art, these stages are described below.

The collection stage consists of optical hardware that brings sunlight from the exterior to an aperture in the envelope of a building.

The conditioning stage consists of optical processing elements that interface the radiant output of the collection stage to subsequent stages. For example, the ultraviolet and infrared portions of the spectrum may be removed at the conditioning stage leaving the visible portion for illumination. The removed portion of the spectrum may be re-directed towards one or more thermal applications inside a building.

The distribution stage brings radiant flux from any number of collection stages to one or more destinations inside a building. For lighting applications, this stage introduces a measure of flexibility for the placement of luminaires.

An outlet stage is where radiant flux exits the distribution stage for a given application. For example, this stage may include one or more varieties of luminaires or fixtures comprised of optical elements for directing the final entry of light into a building. Solar illumination may be integrated with electric lighting at the outlet stage. The outlet stage may open into a thermal appliance such as a water heater or oven.

It is a principal object and advantage of the present invention to provide a radiant energy system that efficiently and effectively collects and conditions solar or lunar flux for distribution inside a building.

It is a further object and advantage of the present invention to provide a solar collection system that utilizes a minimum number of mirrors to effectively and automatically track the sun, thereby minimizing losses due to absorption and scattering at the collection surfaces.

It is another object and advantage of the present invention to provide a radiant energy system that collimates collected sunlight and reduces its cross-sectional area to match the cross-sectional area of the system's distribution stage, thereby minimizing losses and chromatic aberration.

Other objects and advantages of the present invention will in part be obvious, and in part appear hereinafter.

SUMMARY OF THE INVENTION

In accordance with the foregoing objects and advantages, the present invention provides a system for collecting and conditioning the radiant flux of sunlight or moonlight. The present invention generally consists of a first parabolic reflector, a second parabolic reflector that is smaller in diameter that the first reflector, but is spaced from and attached directly thereto such that the two reflectors include a common optical axis, and a third planar reflector. A structural framework supports the three reflectors and includes a light pipe, or other light distributing channel, through which the collected sunlight is sent.

The first reflector is mounted to the ends of a pair of elongated arms that are attached to the flat end of a semi-circular track. The elongated rods are pivotally attached to one of the ends of corresponding, vertically extending rods, the opposite ends of which are fixedly attached to a circular track. The third reflector is attached transversely across its midpoint to the pivot rod that attaches the elongated rods to the vertically extending rods, and is also connected near its bottom end, via two pairs of first and second levers, to the elongated and vertically extending rods, respectively.

The semi-circular track includes a first motor which drives a gear that mates with the semi-circular track, causing it to move in a semi-circular path, thereby pivoting the first and second reflectors as it moves along the track. A computer program controls the first motor such that the common optical axis of the first and second reflectors is always coincident with the elevation angle (which is the complement of the zenith angle) of the sun.

The circular track includes a second motor which drives a gear that mates with the track, causing it (and the vertically extending rods) to move in a circular path. A computer program controls the second motor such that the reflectors are always aligned with the azimuth angle of the sun.

The levers attaching the third reflector to the elongated and vertically extending rods, respectively, operate to pivot the third reflector at half the rate at which the first and second reflectors are pivoted via the semi-circular track. As sunlight is reflected from the first reflector, off of the second reflector through the central aperture formed through the center of the first reflector, it is reflected directly downwardly by the third reflector through the center of the circular track, at which point the light enters a light pipe which distributes it accordingly. By causing the third reflector to pivot at half the rate of the first and second reflectors, the light is ensured of being directed accurately downwardly into the light pipe. Also, based on the size of the aperture formed through the first reflector, the cross-sectional area of the collimated beam of sunlight is essentially identical to the cross-sectional area of the light pipe, thereby limiting any losses at the point of entry.

BRIEF DESCRIPTION OF THE DRAWINGS

The present invention will be better understood by reading the following Detailed Description in conjunction with the accompanying drawing figures, wherein.

DETAILED DESCRIPTION

Figure 1:
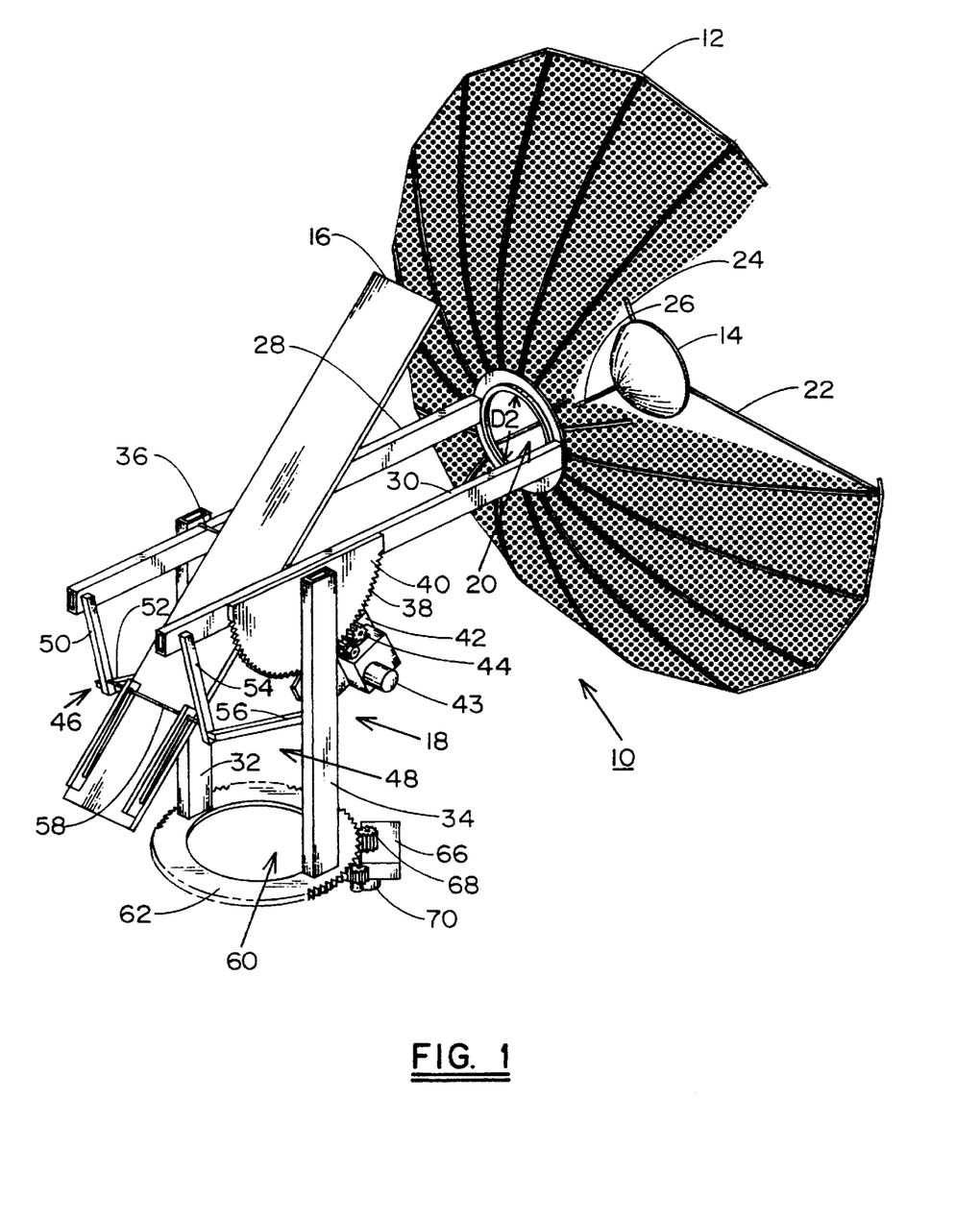
FIG. 1 is a perspective view of the present invention.
Figure 2:
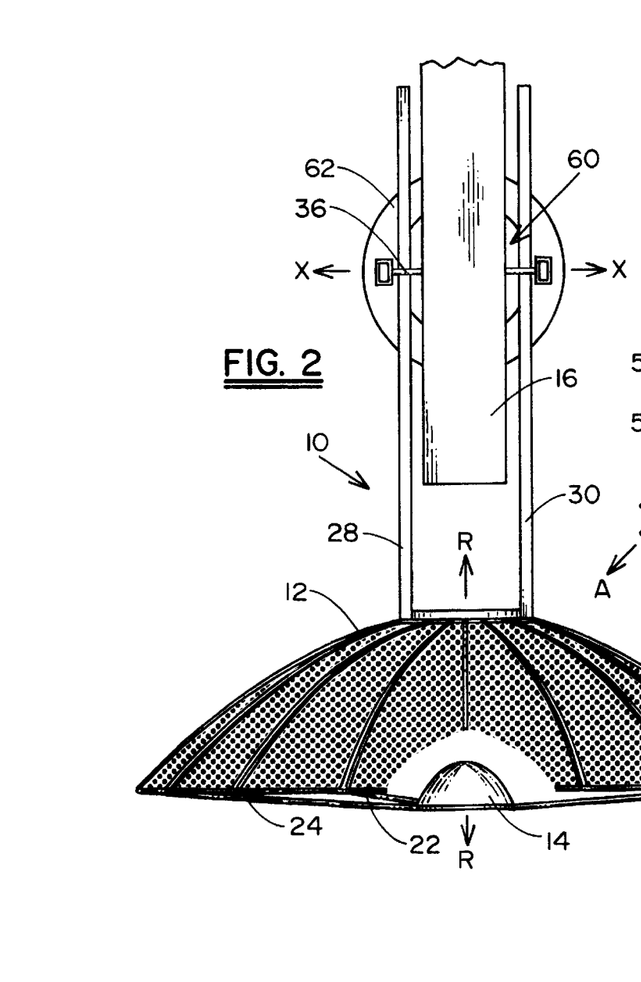
FIG. 2 is a top plan view thereof.
Figure 3:
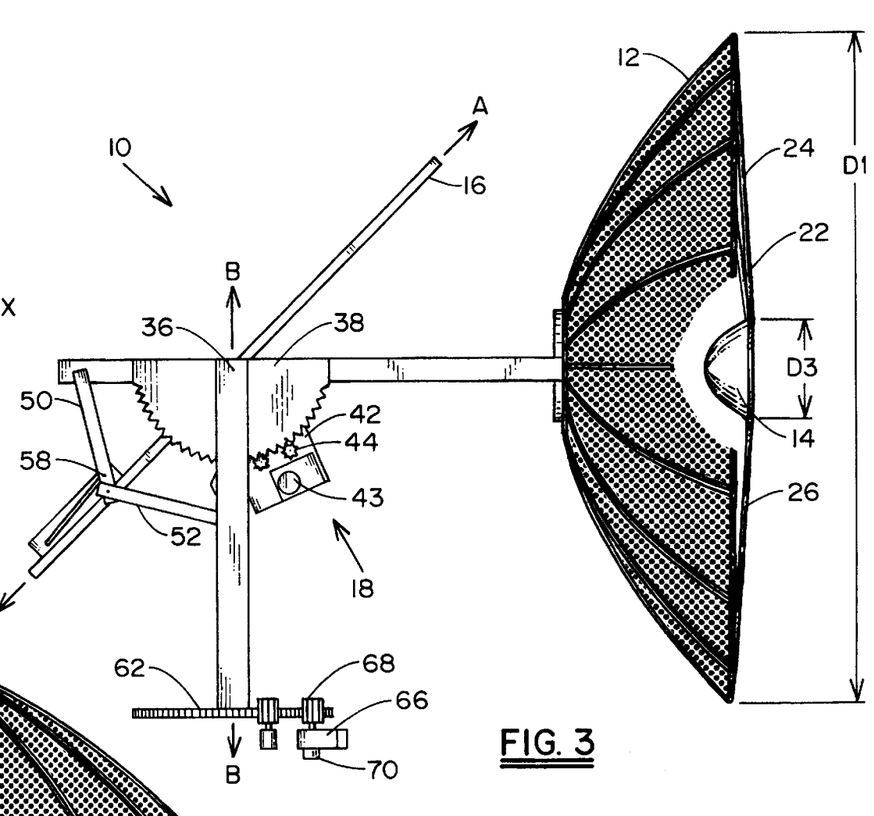
FIG. 3 is a side elevation view thereof.

Referring now to the drawings, wherein like reference numerals refer to like parts throughout, there is seen in FIGS. 1–3, a radiant energy collection system, designated generally by reference numeral 10. Although referred to as a "collection" system, it should be understood that the present system not only "collects" radiant energy, but also conditions and collimates the energy for general distribution. In addition, although this description will refer to the collection of solar energy, it is to be understood that radiant lunar energy could be collected in a like manner.

Collection system 10 is generally comprised of a first, parabolic reflector 12, a second, parabolic reflector 14, and third, planar reflector 16, and a structural framework, denoted generally by reference numeral 18, for supporting reflectors 12, 14 and 16. First, parabolic reflector 12 is of a first diameter, D1, and includes an aperture 20 formed centrally therethrough which is of a diameter, D2, and includes an optical axis R—R extending therethrough. Second, parabolic reflector 14 is fixedly attached to first reflector 12 via three elongated braces 22, 24 and 26, preferably set 120° apart from one another, which maintain a predetermined separation of first and second reflectors 12 and 14, respectively, and maintain the two reflectors in fixed, relative position to one another along common optical axis R—R. Second reflector 14 is of a third diameter, D3, which is slightly smaller than diameter D2 of aperture 20, thereby permitting any stray sun rays which pass by the edge of reflector 14 to pass through aperture 20.

The rear surface of first reflector 12 is fixedly attached to terminal ends of a pair of elongated arms 28, 30 which are pivotally mounted to a pair of vertically extending arms 32, 34, respectively, via a pivot rod 36 to which they are fixedly attached and that extends along its elongated, pivot axis X—X. One of arms 28, 30 (arm 30 in the drawings) is attached to the flat end of a semi-circular track 38 which includes teeth 40 on its semi-circular portion. A motor 42 and sensor assembly 43 are securely mounted to vertically extending arm 34 (or 32), and with motor 42 including a drive gear 44 that mates with teeth 40 of track 38. Actuation of motor 42 causes gear 44 to rotate, thereby moving track 38 accordingly, and causing arms 28, 30 to pivot about axis X—X. Hence, first and second mirrors 12 and 14, respectively, also pivot with arms 28 and 30.

Figure 4A:
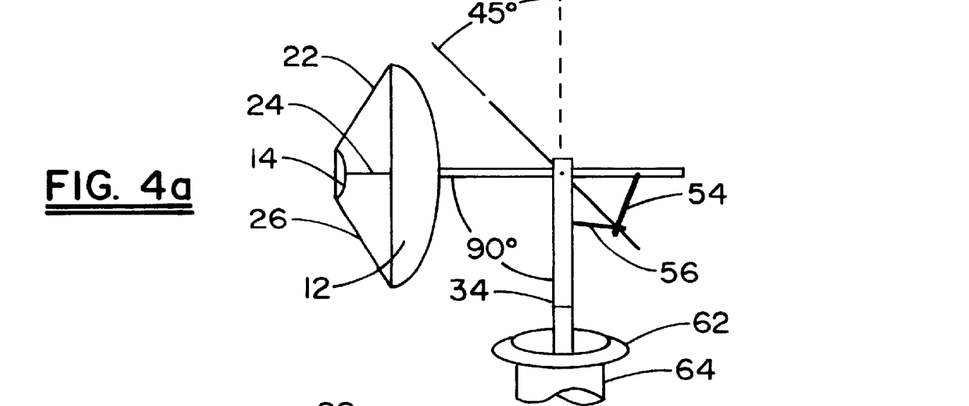
FIGS. 4(a)–4(c) are illustrative, side-elevational views in a variety of orientations showing the present invention.
Figure 4B:
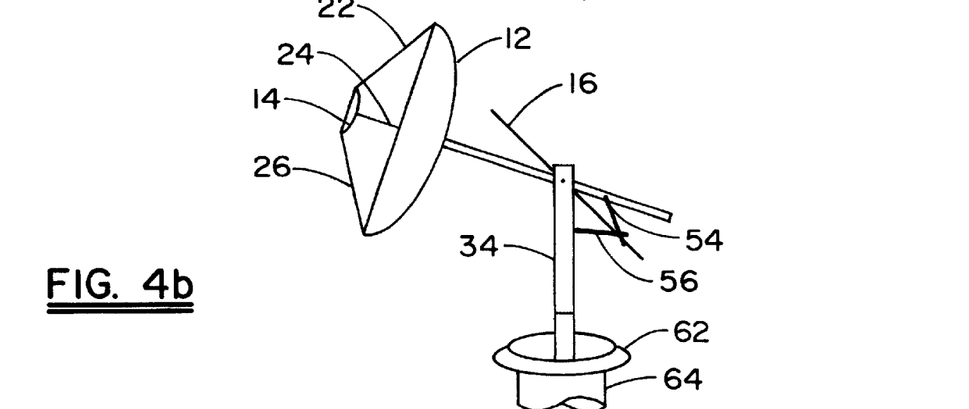
Figure 4C:
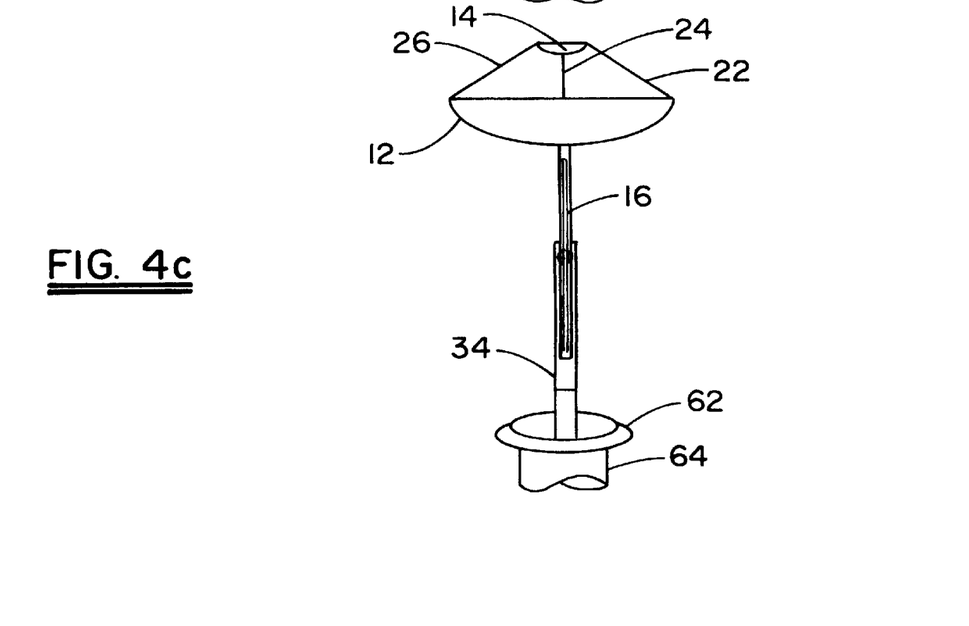

Actuation of motor 42 is controlled by a microprocessor 45, or other suitable controller, which sends data to the motor at predetermined intervals, preferably every one minute. When system 10 is installed in a particular location, the longitude and latitude coordinates are determined by a Global Positioning System (GPS) and microprocessor 45 is programmed with the coordinates. Software contained in microprocessor 45 reads the GPS supplied coordinates and uses that data to tabulate and store azimuth and elevation tracking data for that location at the predetermined time intervals (e.g., each minute) throughout a year. Accordingly, at each predetermined time interval, microprocessor 45 sends sensor assembly 43 coordinates to track the elevation of the sun, sensor assembly 43 compares those coordinates with the motor's current coordinates and causes motor 42 to adjust the coordinates accordingly. By continuously causing motor 42 to adjust track 38, and hence arms 28 and 30, reflectors 12 and 14 are continuously directed with their optical axis R—R being coincident with the elevational angle of the sun, as is illustrated in FIGS. 4(a)–4(c).

The first stage of the collection process involves maintaining reflectors 12 and 14 in axial alignment with the solar rays, thereby causing those rays to be reflected off of reflector 12 towards reflector 14 which, in turn, reflects the rays back towards reflector 12. However, due to the parabolic shape of reflectors 12 and 14, and the geometry of their respective diameters and the fixed spacing between them, the rays reflected by reflector 14 pass through aperture 20 formed through reflector 12. Aperture 20 shapes and collimates the rays into a cross-sectional area substantially equivalent to its diameter D3.

Once the rays pass through aperture 20, they are received and reflected downwardly by planar reflector 16. Reflector 16 is elongated along an axis A—A (see FIG. 3) and pivot pin 36 extends transversely through its midpoint, thereby permitting reflector 16 to pivot about axis X—X. To hold reflector 16 in a fixed position, a pair of scissor-type lever assemblies, denoted generally by reference numerals 46 and 48, respectively, attach reflector 16 to arms 28, 32 and 30, 34, respectively. Lever assemblies 46 and 48 each include two elongated arms 50, 52 and 54, 56, respectively, that are pivotally linked to one another via a connector, such as a rivet, that passes through both arms adjacent terminal ends thereof. An elongated rod 58 extends between arms 50 and 54 of assemblies 46 and 48, respectively, thereby maintaining the assemblies in fixed relative positions with respect to one another. Rod 58 also passes through reflector 16, adjacent one end thereof, thereby linking it to lever assemblies 46 and 48.

Arms 50 and 52 connect reflector 16 to arms 28 and 32, respectively, while arms 54 and 56 connect reflector 16 to arms 30 and 34, respectively. As motor 42 causes track 38 to rotate, thereby imparting the rotational motion to arms 28 and 30 as previously described, the geometry of lever assemblies 46 and 48 causes reflector 16 to pivot about axis X—X at a rate equal to half that of arms 28 and 30 (and, hence, reflectors 12 and 14), thus causing reflector 16 to bisect the angle formed between arms 28, 30 and the vertical axis. FIG. 4(a) effectively illustrates the bisecting effect (e.g., arms 28, 30 form a 90° angle with the vertical axis, while reflector 16 extends in a plane that forms a 45° angle with the same vertical axis).

Figure 5:
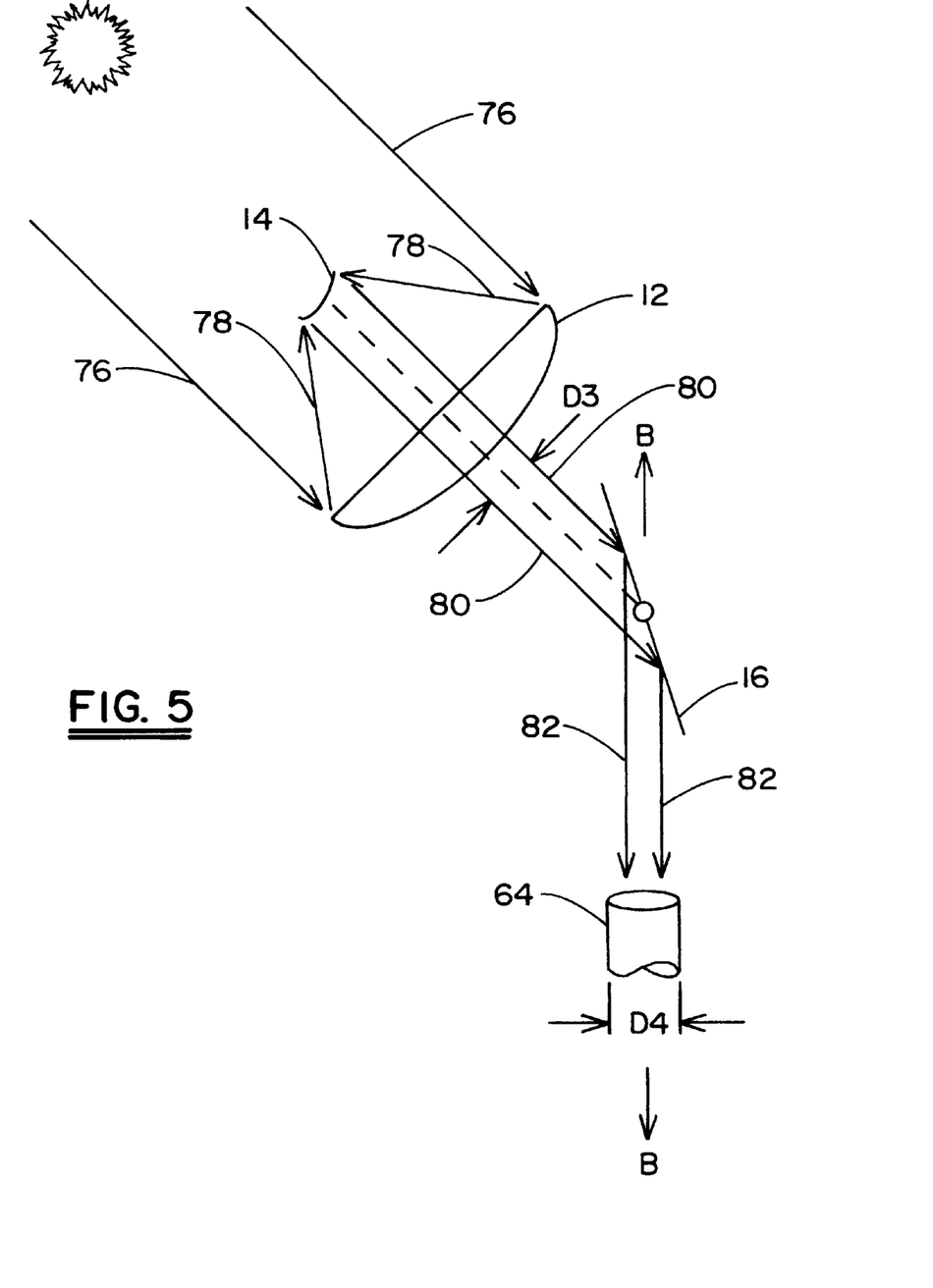
FIG. 5 is an illustrative view of the ray paths of sunlight collected by the present invention.

The end result of the bisecting effect of reflector 16, is that it receives the rays passing through aperture 20 and reflects them directly downwardly about a vertically extending axis B—B (see FIG. 5). The downwardly reflected rays pass through an aperture 60, which is formed centrally through a circular track 62, and enter a light pipe 64 attached to track 62. Light pipe 64 is of a diameter, D4 (see FIG. 5), slightly larger than diameter D2 of aperture 20. Although light pipe 64 is shown for illustrative purposes, it should be understood that the channel can be any means for conveying light to a distribution system (e.g., a fiber optic network). Due to the collimated nature of the reflected rays, as a consequence of passing through aperture 20, the collimated beam is of a diameter essentially equal to diameter D3. However, due to slight dispersion of the rays, diameter D4 being slightly larger than diameter D3 will preclude loss of those rays that stray outside the bounds of diameter D3.

In addition to tracking the sun's elevation, collection system 10 must also track the solar azimuth angle to ensure that the shared optical axis R—R remains pointed at the sun. Specifically, in its most efficient form, system 10 must rotate around vertically extending axis B—B which lies in a common, vertical plane with optical axis R—R. To effect this rotation, circular track 62, having teeth around its outer, peripheral edge, is fixedly attached to bottom ends of arms 32 and 34. A motor 66 is mounted to a fixed structure (not shown) and includes drive gear 68 attached thereto which mates with the teeth formed on track 62, thereby driving track 62 in a circular pattern. A sensor assembly 70, electrically attached to motor 66, receives azimuth angle data from a microprocessor 45 containing the azimuth angle data for the particular location where assembly 10 is installed (based upon the same GPS reading done for motor 42). At predetermined intervals (e.g., every one minute), microprocessor 45 sends updated azimuth angle data to sensor assembly 70, which in turn, compares the new coordinates with current coordinates, and causes motor 66 to drive track 62 to the new coordinates, thereby maintaining assembly 10 in aligned relation with the azimuth angle of the sun.

Figure 8:
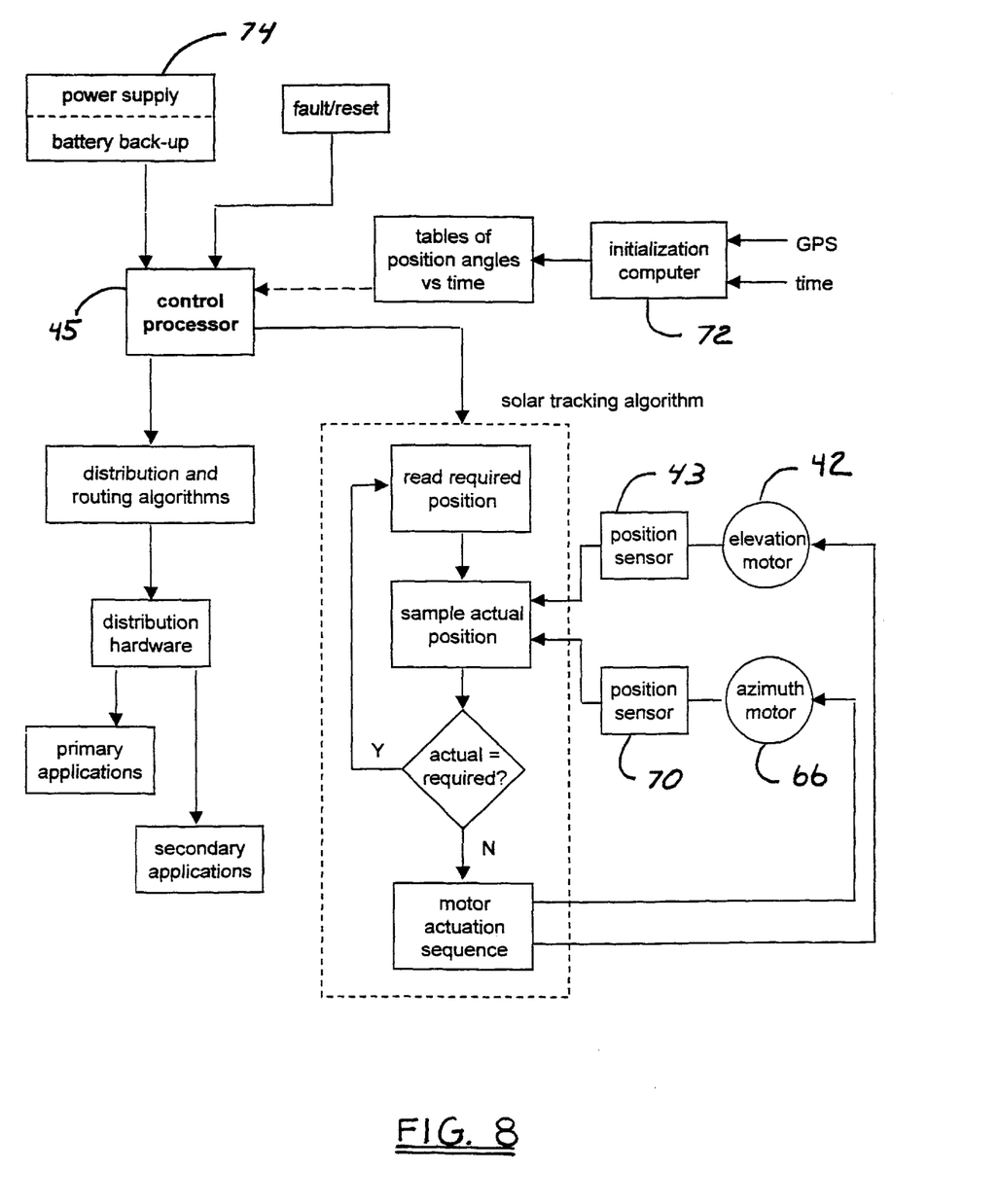
FIG. 8 is a flow chart illustrating the adjustment process by which the reflectors track the solar trajectory.

Particular reference being had to FIG. 8, a flow chart illustrating the tracking process is provided. As previously explained, a GPS is used to gather the precise coordinates of the installation site, and the coordinates together with the exact time (year, month, day, hour, minute and second) is programmed into an initialization computer 72. Tables of solar position angles versus time are then generated by computer 72, and these tables are embedded in a microprocessor 45 which is continually powered by any conventional power source 74, preferably solar panels with a battery back-up. Microprocessor 45 then runs a solar tracking algorithm which updates elevation and azimuth angles at predetermined intervals (e.g., every one minute), thereby causing motors 42 and 66, respectively, to adjust the position of assembly 10. Microprocessor 45 can also be programmed to control the distribution and routing of the sunlight and conduct any other interactive processes with end use appliances that system 10 is capable of energizing.

Now that the general structure of structure 10 has been explained, the physics of the system will be explained with the understanding that the entire collection stage illustrated in FIGS. 1–3 may be mounted anywhere to collect radiant celestial power for a building. It may be inside a building, such as under a transparent domed roof, or outside a building attached to a roof, sidewall, or pole. The internal optics of the subsequent distribution stage are assumed to transport the collected beam to wherever it is used inside a structure. Additionally, a transparent shelter for the collection stage may enclose it to protect it from adverse weather conditions.

Representative, illustrative views of the collection stage's tracking of the sun's elevation angle are given in FIG. 4(a)–4(c). In each of the views, a center cross-section from the side is seen. The optic axes of first and second reflectors 12, 14 coincide with and lie in the plane defined by the sun's azimuth angle.

When the sun is at the horizon, the collection stage orients itself as shown in FIG. 4(a). Rods 28 and 30 lie at a 90° angle with respect to the azimuth axis of rotation about axis B—B. At the same time, planar reflector 16 is at a 45° angle with respect to axis B—B. The collected beam is thereby directed through aperture 60 in the center of track 62.

At the highest possible solar elevation, the collection stage appears as in FIG. 4(c), i.e., extending along a vertical axis. At high solar elevation angles, planar reflector 16 occludes a certain fraction of the beam directed at the aperture to the distribution stage. Calculations show that there are upper limits on the length of planar mirror 16 for which occlusion of collected flux is negligible.

As seen in FIG. 5, solar rays 76 are incident on reflector 12 and are kept parallel to the shared optical axis R—R of reflectors 12 and 14 by the solar-tracking functions that control the collection stage. Reflections 78 from reflector 12 converge towards reflector 14. Contour and distance parameters are selected so that a concentrated beam of collimated rays 80 travels through central aperture 20 in reflector 12 (see calculations below).

It can be shown by way of elementary trigonometry that the cross-sectional area of the beam comprised of rays 82 does not change with either changing solar elevation angle or changing solar azimuth angle. In this way, the present invention provides a concentrated collimated beam to a distribution stage with the minimum number of reflections.

The mathematics and physics of the present system are as follows.

Figure 6A:
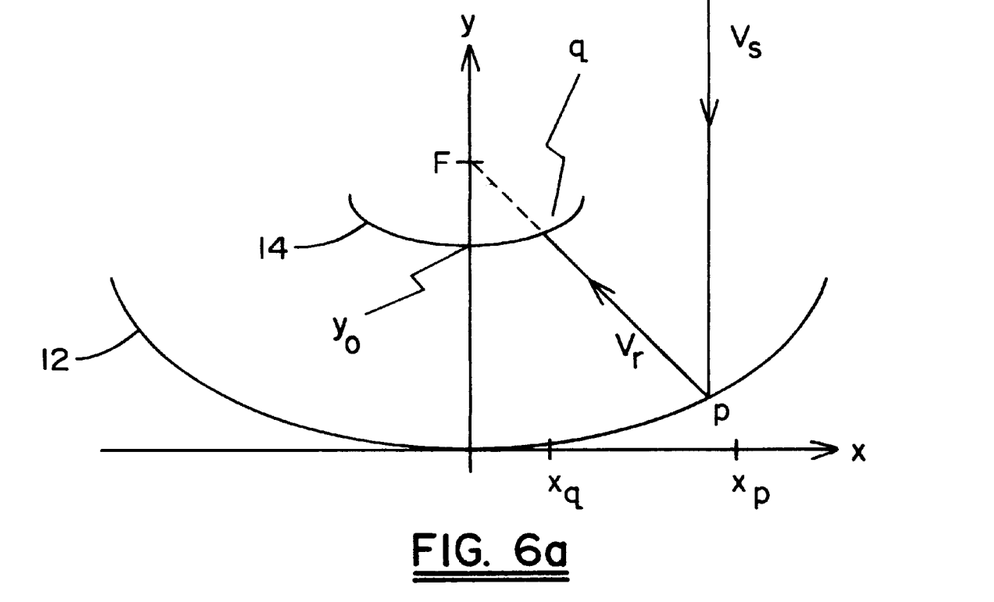
FIGS. 6(a)–6(b) are graphical representations of a variety of geometric conventions from deriving the optical relationships between the parabolic reflectors of the present invention.

With reference to FIG. 6(a), reflectors 12, 14 share the same focal point. The equation for the reflector 12 is $$y = a_1 x^2 \tag{1}$$

and the equation for reflector 14 is $$y = a_2 x^2 + y_0 \tag{2}$$

where $y_0$ is the offset of the secondary along the y axis.

The parabolas are arranged such that they share a common focal point at F on the y axis. From the standard definition of parabolic geometry and from inspection of FIG. 6(a), it is apparent that:

$$F = \frac{1}{4a_1} = \frac{1}{4a_2} + y_o \tag{3}$$

A ray in the direction of the unit vector $v_s$ in FIG. 6(a) represents the solar input to reflector 12. It is assumed that the tracking functions of the collection system always keep $v_s$ parallel to the y axis of the figure. The input ray strikes the primary reflecting surface at a point p. The reflection from the primary is in the direction of unit vector $v_r$ and strikes the secondary at a point q.

The equations for the two unit vectors of FIG. 6(a) are:

$$v_s = -j \tag{4}$$

$$v_r = v_{rx} i + v_{ry} j \tag{5}$$

The fact that the two parabolas share the same focal point carries with it an important design relationship between the constants $a_1$ and $a_2$ from equations (1) and (2), respectively. This relationship can be derived by first noting that in the absence of reflector 14, the ray reflected from reflector 12 would strike the point (0,F). Taking $p=p(x_p, y_p)$ and the vector components from Eqn. (5), the following parametric equations can be written:

$$0 = x_p + v_{rx} t \tag{6a}$$

$$F = y_p + v_{ry} t \tag{6b}$$

where t is the distance from point p to the focus F. Solving Eqns. (6) for F gives the following expression for the value of the focus:

$$F = a_1 x_p^2 - \left(\frac{v_{ry}}{v_{rx}}\right) x_p \tag{7}$$

The term in parentheses on the right side of Eqn. (7) is seen to be the slope of the line from point p to the focus. If the secondary is present, this line intersects it at the point q. In general, the line from point p to the focus has as its equation $$y = \left(\frac{v_{ry}}{v_{rx}}\right) x + F \tag{8}$$

The point q is on this line. A pair of equations for the point q $q=q(x_q, y_q)$ may be written. The first equation is found by solving Eqn. (7) for the term $(v_{ry}/v_{rx})$ and substituting it into Eqn. (8). The second equation is taken directly from the definition of the secondary's contour, Eqn. (2).

$$y_q = \left(a_1 x_p - \frac{F}{x_p}\right) x_q + F \tag{9a}$$

$$y_q = a_2 x_q^2 + y_0 \tag{9b}$$

Subtracting Eqn. (9a) from (9b) yields the following quadratic equation for the value of $x_q$:

$$a_2 x_q^2 + \left(\frac{F}{x_p} - a_1 x_p\right) x_q + (y_o - F) = 0 \tag{10}$$

Recall from Eqn. (3) that $F = \frac{1}{4}a$, and that $(y_0 - F) = -\frac{1}{4}a_2$. These substitutions can be made into Eqn. (10), changing it to a form that is suitable for the solution of $x_q$ in terms of $a_1$, $a_2$, and $x_p$. Doing so, and taking the positive root of the discriminant, the following important design relationship emerges:

$$\frac{a_1}{a_2} = \frac{x_q}{x_p} \tag{11}$$

In other words, the ratio of the coefficient $a_1$ to the coefficient $a_2$ is equal to the ratio of the x-coordinate of the secondary where the primary's reflection strikes it to the x-coordinate where the primary's reflection originates. This is a completely general result and is due to the fact that the two parabolas shown in FIG. 6(a) share the same focus.

A practical use of Eqn. (11) comes from a consideration of the rim rays. The focal length of the primary, F, is generally known, and the desired spans (rim-to-rim distances) of the reflectors are either known or selectable within a range. The problem becomes one of finding: the focal length of the secondary (defined simply as $\frac{1}{4}a_2$), and, the separation distance $y_0$ between the reflectors.

Assume that the focal length of the primary is known. If $s_1$ is the span of reflector 12 and $s_2$ is the span of reflector 14, the values $x_p = s_1/2$ and $x_q = s_2/2$ can be substituted into Eqn. (11). The equation can then be solved for $a_2$, from which the secondary's focal length can be found. Taking F as the focal length of reflector 12, the separation distance $y_0$ as shown in FIG. 6(a) may then be found using Eqn. (3). This completely specifies the information needed to match and separate the parabolas.

It must be demonstrated that the ray reflected from reflector 14 is parallel with the input ray to reflector 12. This being the case, the span of reflector 14 defines the extent of the aperture needed at the center of reflector 12 through which the collected flux transfers to the distribution stage.

Figure 6B:
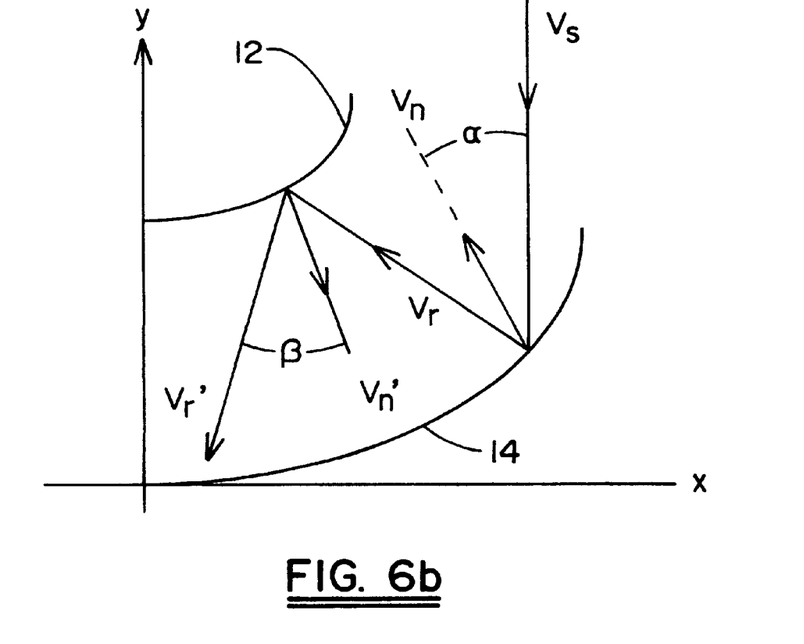

The vector quantities needed for this proof are sketched in FIG. 6(b). Two of the vectors shown in FIG. 6(a), $v_s$ and $v_r$, are the same as for FIG. 6(b). The three vectors introduced in FIG. 6(b) are:

$v_n$—the vector normal to the reflecting surface of the primary;

$v_n'$—the vector normal to the reflecting surface of the secondary where the primary reflection $v_r$ strikes it; and, $v_r'$—the secondary reflection The algebraic representation of the components of these vectors will follow the conventions of Eqns. (4) and (5).

The normal vectors can be defined in terms of a tangent vector. It can be shown that a unit tangent vector, t, to a point on a parabola has the following components:

$$t = \frac{i + 2axj}{\sqrt{1 + 4a^2 x^2}} \tag{12}$$

Because the tangent and normal vectors are perpendicular, their dot product is equal to zero:

$$(v_{nx})(t_x) + (v_{ny})(t_y) = 0 \tag{13}$$

Taking component signs into account, the following expressions for unit normals satisfy Eqn. (13):

$$v_n = \frac{-2axi + j}{\sqrt{1 + 4a^2 x^2}} \tag{14}$$

$$v_n' = \frac{2axi - j}{\sqrt{1 + 4a^2 x^2}} \tag{15}$$

Suppose that $v_n$ is located at point p on reflector 12 and that $v_n'$ is located at point q on reflector 14, as depicted in FIG. 6(a). Eqn. (14) then becomes a function of $x = x_p$, and Eqn. (15) becomes a function of $x = x_q$. Solving Eqn. (11) for $x_q$ and substituting into Eqn. (15) provides the following results:

$$v_n' = -v_n \tag{16}$$

$$\alpha = \beta \tag{17}$$

where the angles $\alpha$ and $\beta$ are as shown in FIG. 6(b). From these results, standard dot product conventions give the result needed to characterize the secondary reflection:

$$v_r \cdot (-v_s) = v_r' \cdot (v_r) \tag{18}$$

The only way for the equality of Eqn. (18) to hold is if $$v_r' = v_s \tag{19}$$

In other words, the secondary reflection is parallel to the input solar rays. This is a completely general result and therefore applies to the entire extent of the primary and secondary when properly matched.

The amount of flux collected with the present invention is proportional to both the cross-sectional area of reflector 12 and the instantaneous value of the sun's radiant power per unit area of incidence. As discussed abundantly in the prior art, there are both thermal and lighting applications for the collected solar power.

In addition, the technology may be employed in whole or in part to provide electricity via photovoltaic cells. Possible embodiments include simultaneously using portions of the collected beam's spectrum for three different applications: One for heating (e.g., for space conditioning, the production of hot water, or cooking), one for lighting, and one for the generation of electricity.

In the present invention, the size of reflector 14 is determined by the size of the distribution stage's aperture. The consequence is that large reflectors 12 create higher concentration ratios. An exploration of this consequence is given for the case of solar lighting—the illumination of the interior of a structure with sunlight.

There are a number of installation issues associated with the concentration ratio of a solar collection stage. In certain regions, the level of solar concentration must comply with fire codes. It may be desirable to use special heat-resistant materials in cases of substantial concentration. A representative computation may be given to guide designers in these matters.

The starting quantity of interest in this example is solar illuminance, which is usually expressed in power units of lumens per unit area. A method called a design day calculation is often invoked to specify an average amount of power that may be collected. For the continental United States, the average annual value of solar illuminance is about 8,000 lumens per square foot (viz., DiLaura, D. L., et al., "Recommended Practice for the Calculation of Daylight Availability." *Journal of the Illuminating Engineering Society*, pgs 381–392, July 1984).

The solar collection aperture is the area of reflector 12 less the area of reflector 14. Accordingly, $$\Phi = \left[\pi\left(\left(\frac{s_1}{2}\right)^2 - \left(\frac{s_2}{2}\right)^2\right)\right] \times 8,000 \tag{20}$$

where $\Phi$=design day collection power in lumens
$s_1$=span of primary in feet
$s_2$=span of secondary in feet
The geometric concentration ratio, $C_g$, is:

$$C_g = \frac{\left(\frac{s_1}{2}\right)^2 - \left(\frac{s_2}{2}\right)^2}{\left(\frac{s_2}{2}\right)^2} \tag{21}$$

Figure 7:
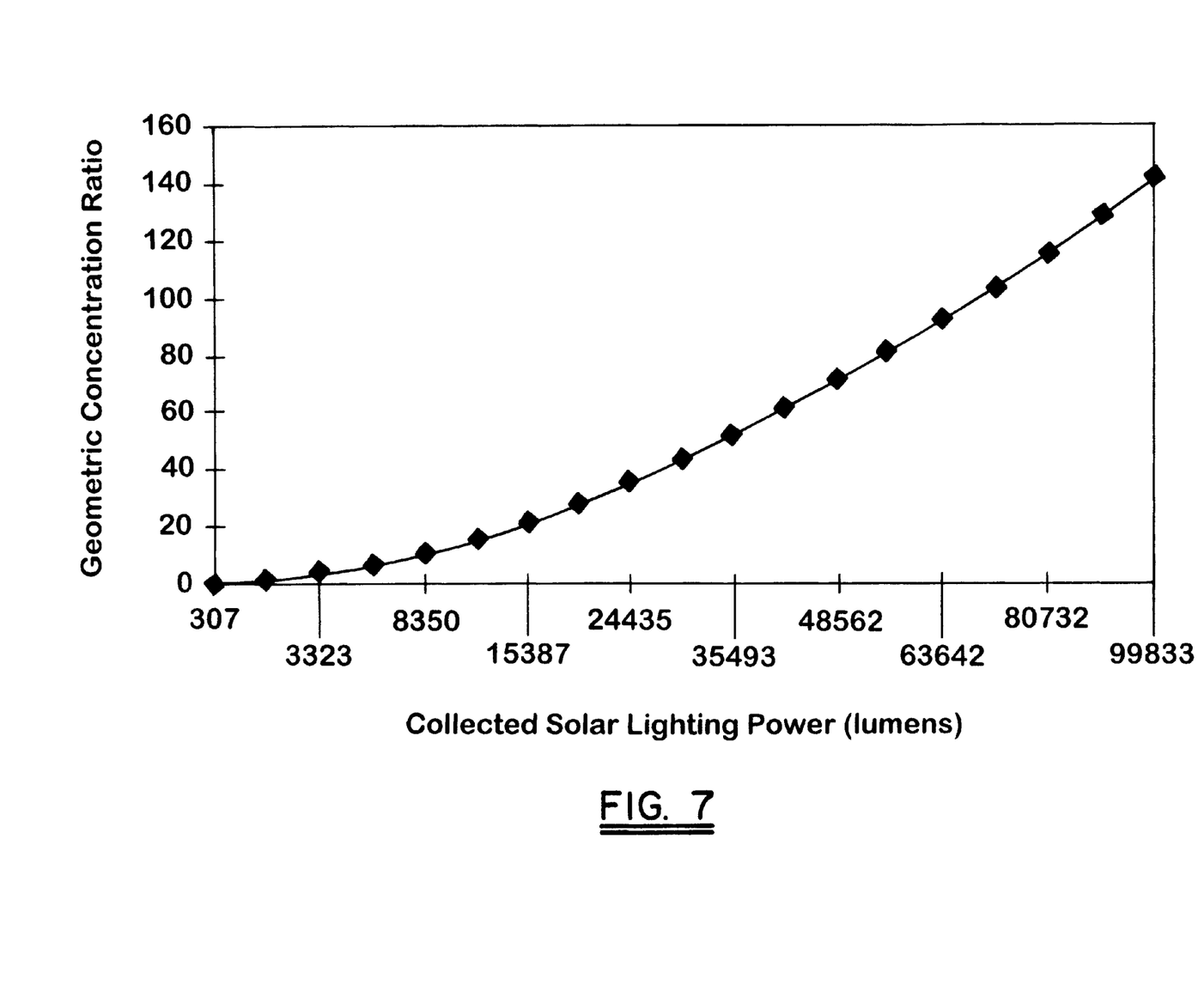
FIG. 7 is a graphical representation of a relationship between collection stage concentration ratio and collected solar power.

In many installations, the diameter of the distribution stage's aperture is anticipated to be about four inches. FIG. 7 is a plot of geometric concentration ratio as a function of design day collection power of the primary for a secondary span of four inches. It is seen that at about 80,000 lumens of design day collection power in this example, sunlight must be concentrated by more than 100 times.

The present invention can be used to track and collect radiant energy from the moon as well as the sun. The principal difference between the two applications is in the instructions for the tracking functions. It is assumed that the invention can be automated or programmed to track either the sun or the moon at different times of the day and month.

What is claimed is:

1. A system for delivering radiant energy to a spatially fixed, enclosed space from an extraterrestrial source which moves at known rates in azimuth and elevation relative to said space to provide visual illumination for persons therein, said system comprising:

a) light collecting means having a first, optical axis for receiving said radiant energy directly from said source, along said first, optical axis, and directing a beam of said radiant energy along said first, optical axis;

b) light reflecting means consisting essentially of a single, planar, reflecting surface in a plane intersected by said first axis for redirecting said beam from said first axis along a second axis; and c) light delivering means having a first portion positioned on said second axis to receive said beam directly from said reflecting surface, and a second portion, physically remote from said first portion and positioned to deliver said beam directly to said space to provide said visual illumination thereof.

2. The system of claim 1 and further comprising first movement means for effecting simultaneous and equal rotation of said collecting means and said reflecting means about said second axis.

3. The system of claim 2 and further comprising second movement means for effecting simultaneous and unequal rotation of said collecting means and said reflecting means about a third axis, perpendicularly intersecting both said first and second axes, said first and second movement means cooperatively moving said first axis commensurately with changes in said azimuth and elevation to maintain said first axis substantially directed at said extraterrestrial source.

4. The system of claim 1 wherein said reflecting surface is elongated, having a longitudinal axis intersecting all of said first, second and third axes.

5. The system of claim 1 wherein said second axis intersects the center of Earth.

6. The system of claim 1 wherein said light delivering means is a light pipe.

7. The system of claim 6 wherein said light pipe has first and second ends and wherein said first and second portions of said light delivering means comprise said first and second ends, respectively.

8. The system of claim 1 and further including first mounting means for supporting said collecting means and said reflecting means for simultaneous and equal rotation about said second axis, and second mounting means for supporting said collecting and reflecting means for simultaneous and unequal rotation about a third axis intersecting both said first and second axes.

9. The system of claim 8 wherein said second mounting means comprises a mechanical linkage between said first and second mounting means.

10. The system of claim 9 wherein said unequal rotation is one degree of rotation of said reflecting means for each two degrees of rotation of said collecting means.

11. The system of claim 8 and further including:

a) a microprocessor having a memory containing a plurality of sets of first and second values commensurate with azimuth and elevation angles, respectively, of said source relative to said first axis at each of a corresponding plurality of points in time;

b) means for generating first and second signals commensurate with said first and second values, respectively at said points in time;

c) first motive means for imparting said simultaneous and equal rotation, and second motive means for imparting said simultaneous and unequal rotation; and d) means responsive to said first and second signals for actuating said first and second motive means at each of said points in time to impart said equal and unequal rotation to said collecting means and said reflecting means to maintain said first axis aligned with the midpoint of said source.

12. The system of claim 11 and further including:

a) first and second positional sensing means for generating, at each of said plurality of points in time, third and fourth electrical signals, respectively, commensurate with the instantaneous rotational positions of said first and second mounting means;

b) means for communicating said third and fourth electrical signals to said microprocessor;

c) means for comparing said third and fourth signals with said first and second values, respectively, at each of said points in time;

d) means for generating first and second difference signals commensurate with the difference between said first value and third electrical signal, and with said second value and fourth electrical signal, respectively; and e) means for operating said first and second motive means in response to values of said first and second difference signals, respectively, above a predetermined threshold value to move said first and second mounting means as required to maintain said first axis aligned with the midpoint of said source at each of said points in time.

13. The system of claim 12 wherein said points in time are spaced at substantially equal intervals.

14. The system of claim 13 wherein said equal intervals are substantially one minute in duration.

15. A system for delivering radiant energy from an extraterrestrial source to a space which is separated from said source by a non-transparent layer having an opening therein for passage of said radiant energy into said space, and immediate practical use therein, said system comprising:

a) light collecting means having a first, optical axis for receiving said radiant energy directly from said source along said first, optical axis, and directing a beam of said radiant energy along said first, optical axis; and b) light reflecting means consisting essentially of a single, planar, reflecting surface in a plane intersected by said first axis for redirecting said beam from said first axis along a second axis and passing through said opening and into said space to provide radiant energy for said immediate practical use.

16. The system of claim 15 wherein said immediate practical use is providing visual illumination of said space for persons therein.

17. The system of claim 16 wherein said second axis is vertical.

18. The system of claim 17 and further including a light pipe extending through said opening for delivering said radiant energy from one side of said non-transparent layer to the other.

19. The system of claim 18 wherein said space is an interior portion of a building and said non-transparent layer is the roof of said building.

20. The system of claim 19 and further including means for rotating said collecting and reflecting means about said second axis.

* * * * *